No. 823,031. PATENTED JUNE 12, 1906.
J. F. BUCKLEY, D. C. KLINE & H. SINGLETON.
CHUCK.
APPLICATION FILED JAN. 20, 1906.

2 SHEETS—SHEET 1.

WITNESSES:
Clarence W. Carroll
D. Gurnee.

INVENTORS:
Jeremiah Frank Buckley
Herbert Singleton
David C. Kline
by Osgood & Davis their Attys No. 823,031. PATENTED JUNE 12, 1906.
J. F. BUCKLEY, D. C. KLINE & H. SINGLETON.
CHUCK.
APPLICATION FILED JAN. 20, 1906.

2 SHEETS—SHEET 2.

WITNESSES:

INVENTORS:

UNITED STATES PATENT OFFICE.

JEREMIAH FRANK BUCKLEY, DAVID C. KLINE, AND HERBERT SINGLETON, OF ROCHESTER, NEW YORK, ASSIGNORS TO THE PRITCHARD-STRONG COMPANY, OF ROCHESTER, NEW YORK, A CORPORATION OF NEW YORK.

CHUCK.

No. 823,031.      Specification of Letters Patent.      Patented June 12, 1906.

Application filed January 20, 1906. Serial No. 296,979.

*To all whom it may concern:*

Be it known that we, JEREMIAH FRANK BUCKLEY, DAVID C. KLINE, and HERBERT SINGLETON, citizens of the United States, and residents of Rochester, in the county of Monroe and State of New York, have invented certain new and useful Improvements in Chucks, of which the following is a specification.

This invention relates to chucks for holding lantern parts in the manufacture of lanterns; and it consists in the device hereinafter described and claimed.

The object of the invention is to cheapen the production of lanterns by reducing the amount of labor, the skill of the labor necessary therefor, and increasing the accuracy of assembling the lantern parts.

Figure 1:
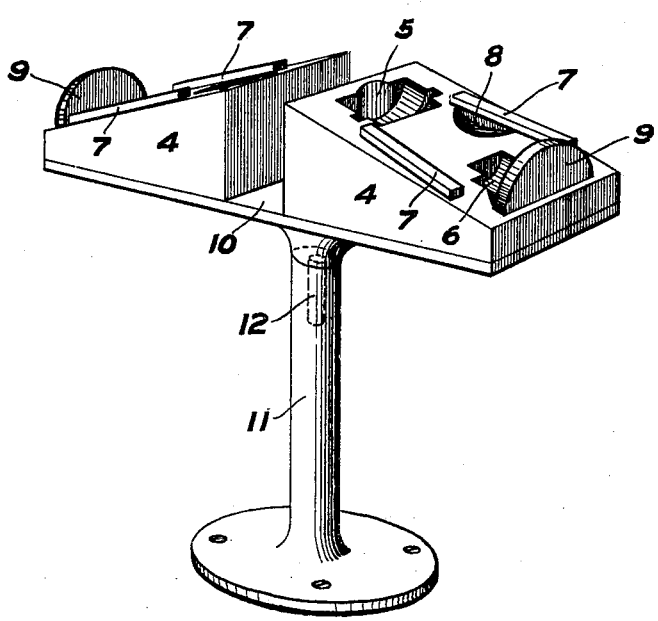
Figure 2:
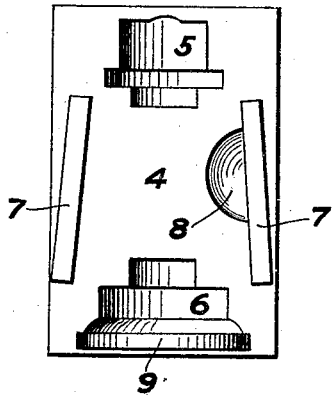
Figure 3:
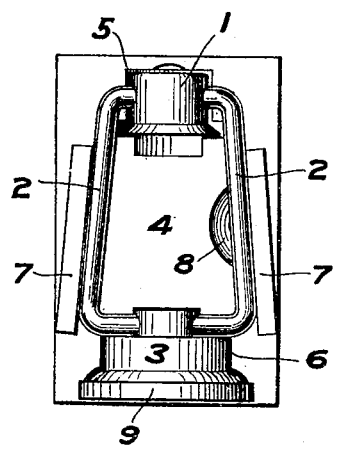
Figure 4:
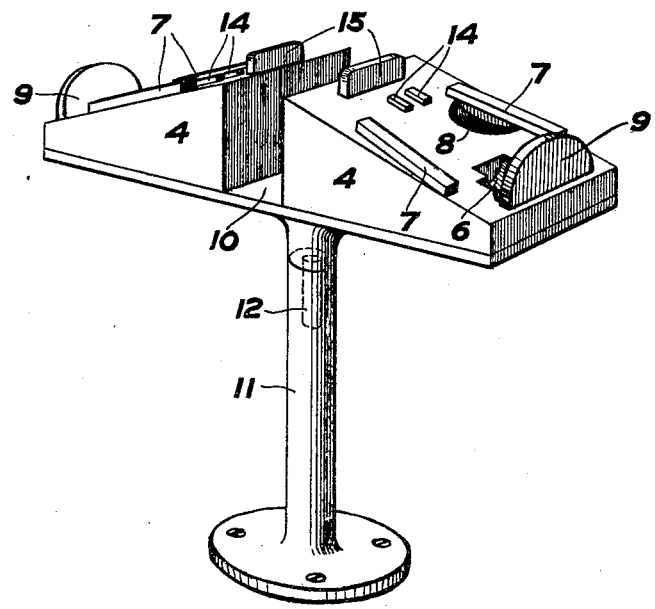
Figure 5:
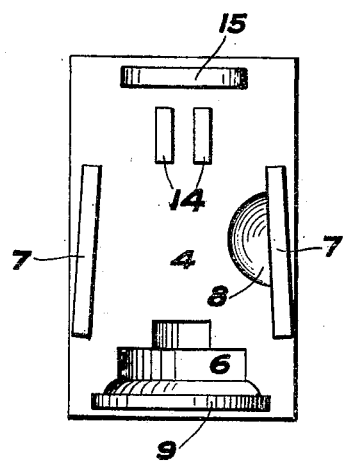
Figure 6:
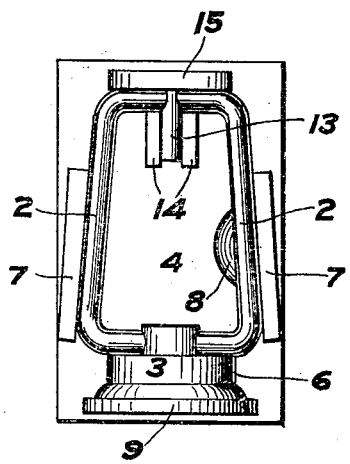

In the drawings, Figure 1 shows a perspective view of a double chuck embodying this invention adapted for the assembling of cold-blast lanterns. Fig. 2 is a plan of the same chuck without any lantern parts therein. Fig. 3 is a plan view of a chuck with lantern parts therein. Fig. 4 is a perspective view of a double rotary chuck for use with hot-blast-lantern frames. Fig. 5 is a plan view of one of the chucks in Fig. 4 without any lantern parts, and Fig. 6 is a plan view of a like chuck with lantern parts therein.

As shown in Fig. 3, a tubular lantern has a frame composed of a head 1, side tubes 2 2, and a font 3. The side tubes, as usual, are curved at their lower ends, and these ends are soldered, respectively, to the head 1 and to the font 3. Heretofore the solderer has set a side tube 2 in position on the font 3, has soldered it thereto, has then repeated the same operation with the other side tube, and then has placed the head in position between the two side tubes and has soldered the upper ends of said side tubes to said head. The solderer therefore performed both the assembling of the parts and the soldering thereof.

A single chuck 4, embodying this invention, contains the socket 5 for holding the head 1 in definite position, the socket 6 for holding the font 3 in a definite position, and the guides 7 7 for holding the side tubes 2 2 in definite position against the head and the font. Where the chuck is made of a block in whose face the sockets 5 and 6 are made and upon whose face the guides 7 7 are constructed, it may have a recess 8 cut in the face adjacent to any one of these parts—say the side tubes 2—for disengaging the parts from the chuck.

In order to insure the certainty of the rectangular position of the font 3 with reference to the side tubes 2 and head 1, a bearing-plate 9 may form a part of the chuck adjacent to and in continuation of the bottom of the socket 6, so that the whole bottom of the font may rest upon a support, and tilting thereof is prevented.

In order to increase the speed of assembling and soldering, two chucks, as shown in Fig. 1, are placed upon a rotary table 10, supported upon a standard 11 and capable of rotation by means of a pin 12, attached to one of these parts, extending into the other. The chucks may have inclined faces, as shown in Fig. 1, in order to increase the ease of manipulation.

The double rotary chuck is employed as follows: Two operators are employed, one being a cheap operator who places a font in the socket 6, a head in the socket 5, and side tubes 2 2 in their proper position. Then the chuck is revolved a half-turn and comes before the solderer, who immediately, having no adjustments of the parts to make, solders the side tubes to the head and to the font on one side, turns the lantern over in the chuck and solders the side tubes to the font and to the head of the other side. The other chuck has meantime been supplied with parts by the assembler. The chuck is then revolved a half-turn, the assembler removes the soldered lantern from the chuck and places the other parts therein, and at the same time the solderer is soldering the assembled parts in the other chuck.

This device is applicable to any form of lantern where the side tubes are to be fastened to a head or top piece and to a font and is therefore applicable to the ordinary form of hot-blast lantern, as shown in Figs. 4, 5, and 6. In this case the head of the lantern is the canopy-tube 13. A socket is made for this canopy-tube by guides or projections 14, whereby it is held in place, and the guide or projection 15 holds the upper ends of the side tubes 2 2 in place and presses them down toward the font. The chuck and rotary device is in other respects the same as that formerly described.

What we claim is—

1. In a chuck device for the manufacture of lantern-frames, a chuck-frame having a socket for a lantern-font, a socket for a lantern-head, and retainers for holding side tubes in position with reference to said head and said font.

2. In a chuck device for the manufacture of lantern-frames, a support, a rotary table thereon having plural chucks each consisting of a chuck-frame having a socket for a lantern-font, a socket for a lantern-head, and retainers for holding side tubes in position with reference to said head and said font.

JEREMIAH FRANK BUCKLEY.
DAVID C. KLINE.
HERBERT SINGLETON.

Witnesses:
A. R. PRITCHARD,
D. GURNEE.